United States Patent
Tanaka et al.

(10) Patent No.: US 11,203,321 B2
(45) Date of Patent: Dec. 21, 2021

(54) OCCUPANT PROTECTION DEVICE

(71) Applicant: TOYODA GOSEI CO., LTD., Kiyosu (JP)

(72) Inventors: Motoyuki Tanaka, Kiyosu (JP); Masashi Hotta, Kiyosu (JP); Koji Kawamura, Kiyosu (JP); Yuji Sato, Kiyosu (JP); Hajime Kitte, Kiyosu (JP); Kenichi Fukurono, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 131 days.

(21) Appl. No.: 16/357,382

(22) Filed: Mar. 19, 2019

(65) Prior Publication Data
US 2019/0299912 A1 Oct. 3, 2019

(30) Foreign Application Priority Data

Mar. 29, 2018 (JP) .............................. JP2018-064851
Aug. 6, 2018 (JP) .............................. JP2018-147888

(51) Int. Cl.
*B60R 21/214* (2011.01)
*B60R 21/231* (2011.01)
(Continued)

(52) U.S. Cl.
CPC .......... *B60R 21/233* (2013.01); *B60R 21/214* (2013.01); *B60R 21/231* (2013.01);
(Continued)

(58) Field of Classification Search
CPC ............... B60R 21/214; B60R 21/232; B60R 2021/23107; B60R 21/205; B60R 21/231
See application file for complete search history.

(56) References Cited

U.S. PATENT DOCUMENTS 2,834,606 A * 5/1958 Bertrand ............... B60R 21/214
280/730.1
4,536,008 A * 8/1985 Brown, Jr. ............ B60R 21/213
280/730.1
(Continued)

FOREIGN PATENT DOCUMENTS

DE 4212416 A1 * 11/1992 ........... B60R 21/214
DE 19860827 A1 * 7/2000 ........... B60R 21/232
(Continued)

OTHER PUBLICATIONS

Machine language translation of DE 10 2005 027 506 A1, obtained from espacenet.com on Jan. 28, 2021.*
(Continued)

*Primary Examiner* — Karen Beck
(74) *Attorney, Agent, or Firm* — Posz Law Group, PLC

(57) ABSTRACT

An occupant protection device for protecting an occupant sitting in a front seat of a vehicle. The occupant protection device includes a front airbag device that is adapted to be mounted in front of the front seat and a roof airbag device that is adapted to be mounted on a roof of the vehicle. The front airbag device includes a front airbag that is inflatable and deployable for protecting an upper body of the occupant when an impact is applied to the vehicle from forward. The roof airbag includes a roof airbag that is inflatable and deployable downwardly between the front airbag and the front seat for protecting a head of the occupant when an impact is applied to the vehicle from forward.

4 Claims, 14 Drawing Sheets

(51) Int. Cl.
   *B60R 21/232*   (2011.01)
   *B60R 21/233*   (2006.01)
   *B60R 21/00*    (2006.01)

(52) U.S. Cl.
   CPC ...... *B60R 21/23138* (2013.01); *B60R 21/232* (2013.01); *B60R 2021/0048* (2013.01); *B60R 2021/23107* (2013.01); *B60R 2021/23308* (2013.01)

(56) References Cited

U.S. PATENT DOCUMENTS

| | | | | |
|---|---|---|---|---|
| 5,366,241 | A * | 11/1994 | Kithil | B60R 21/013 280/730.1 |
| 5,470,103 | A * | 11/1995 | Vaillancourt | B60R 21/214 280/730.1 |
| 6,431,586 | B1 * | 8/2002 | Eyrainer | B60R 21/213 280/730.1 |
| 7,029,030 | B2 * | 4/2006 | Amamori | B60R 21/23 280/730.1 |
| 7,163,229 | B2 * | 1/2007 | Hasebe | B60R 21/233 280/730.1 |
| 7,222,877 | B2 * | 5/2007 | Wipasuramonton | B60R 21/214 280/729 |
| 7,338,069 | B2 * | 3/2008 | Breed | B60R 21/205 280/729 |
| 7,445,284 | B2 * | 11/2008 | Gerfast | B60N 2/4221 297/216.12 |
| 7,784,823 | B2 * | 8/2010 | Heigl | B60R 21/232 280/730.2 |
| 8,240,706 | B2 * | 8/2012 | Bustos Garcia | B60R 21/2165 280/730.1 |
| 8,297,648 | B2 * | 10/2012 | Komoll | B60R 21/231 280/729 |
| 8,579,321 | B2 * | 11/2013 | Lee | B60R 21/233 280/729 |
| 8,807,593 | B2 * | 8/2014 | Lee | B60R 21/213 280/730.1 |
| 9,004,526 | B2 * | 4/2015 | Fukawatase | B60R 21/207 280/730.1 |
| 10,202,095 | B2 * | 2/2019 | Ohno | B60R 21/261 |
| 10,266,145 | B2 * | 4/2019 | Paxton | B60R 21/2338 |
| 10,315,609 | B2 * | 6/2019 | Thomas | B60R 21/2338 |
| 10,486,639 | B2 * | 11/2019 | Nagasawa | B60R 21/232 |
| 10,836,337 | B2 * | 11/2020 | Shin | B60R 21/01512 |
| 10,836,340 | B2 * | 11/2020 | Obayashi | B60R 21/2338 |
| 10,864,872 | B2 * | 12/2020 | Sheldon | B60R 21/214 |
| 2005/0275198 | A1 | 12/2005 | Peng et al. | |
| 2006/0202452 | A1 * | 9/2006 | Breed | B60R 21/30 280/730.2 |
| 2014/0232092 | A1 | 8/2014 | Le Norcy et al. | |
| 2017/0174173 | A1 | 6/2017 | Peyre et al. | |
| 2019/0054888 | A1 * | 2/2019 | Fukawatase | B60R 21/231 |
| 2020/0238941 | A1 * | 7/2020 | Saso | B60R 21/207 |

FOREIGN PATENT DOCUMENTS

| | | | | |
|---|---|---|---|---|
| DE | 10 2005 027 506 A1 * | 1/2007 | | |
| DE | 102014003234 A1 * | 3/2015 | | B60R 21/23 |
| FR | 1392677 A * | 3/1965 | | B60R 21/232 |
| JP | 2005-335694 A | 12/2005 | | |
| JP | 2006-151139 A | 6/2006 | | |
| JP | 2008-284904 A | 11/2008 | | |
| JP | 2013-071704 A | 4/2013 | | |
| JP | 2013-082418 A | 5/2013 | | |
| JP | 2014218215 A * | 11/2014 | | |
| JP | 2019038370 A * | 3/2019 | | |
| WO | WO-2012111073 A1 * | 8/2012 | | B60R 21/233 |
| WO | WO-2020020827 A1 * | 1/2020 | | B60R 21/2342 |

OTHER PUBLICATIONS

Office Action dated Aug. 31, 2021, issued in corresponding JP Patent Application No. 2018-147888 (and English Machine Translation).

* cited by examiner

OCCUPANT PROTECTION DEVICE

CROSS REFERENCE TO RELATED APPLICATIONS

The present application claims the benefit of foreign priority from Japanese Patent Application No. 2018-064851 of Tanaka et al., filed on Mar. 29, 2018 and Japanese Patent Application No. 2018-147888 of Tanaka et al., filed on Aug. 6, 2018, the entire disclosures of which are incorporated herein by reference.

BACKGROUND OF THE INVENTION

1. Field of the Invention

The present invention relates to an occupant protection device for protecting an occupant sitting in a front seat of a vehicle.

2. Description of Related Art

JP 2005-335694 A discloses an occupant protection device which is adapted to be mounted on a vehicle for protecting, by way of example, an occupant sitting in a passenger seat. The occupant protection device includes an airbag which is inflatable with an inflation gas and is adapted to be stored in a roof of the vehicle above the passenger seat in a folded-up configuration. The airbag is designed to be deployed downwardly in front of the passenger seat for covering a front side of the passenger sitting in the passenger seat widely.

The above conventional occupant protection device deploys the airbag downwardly from the roof in an initial stage of airbag inflation, therefore it would indeed be able to quickly protect a head of the passenger when an impact occurs on a front portion of the vehicle. However, the airbag would come to have a big volume since it is designed to cover the front side of the passenger widely for protecting an upper body of the passenger. The occupant protection device configured as described above would require a great storage space, thus has room for improvement in ensuring of a storage space.

SUMMARY OF THE INVENTION

An object of the present invention is to provide an occupant protection device that can be mounted on a vehicle despite a limited storage space in the vehicle, and is able to protect an occupant smoothly.

The occupant protection device of the invention is adapted to be mounted on a vehicle for protecting an occupant sitting in a front seat of the vehicle. The occupant protection device of the invention includes:
a front airbag device that is adapted to be mounted in front of the front seat and actuated when an impact is applied to the vehicle from forward, and includes a front airbag that is inflatable and deployable in front of the front seat for protecting an upper body of the occupant; and
a roof airbag device that is adapted to be mounted on a roof of the vehicle and actuated when an impact is applied to the vehicle from forward, the roof airbag device including a roof airbag that is inflatable and deployable downwardly between the front airbag and the front seat for protecting a head of the occupant.

The occupant protection device of the invention includes the roof airbag device which is mounted on the roof and the front airbag device which is mounted in front of the front seat. The front airbag is adapted to protect the upper body of the occupant while the roof airbag is adapted to protect the head of the occupant. That is, the occupant protection device of the invention is configured such that the front airbag, which is deployed over a wide area in front of the upper body of the occupant and thus has a big volume, is stored in an area in front of the front seat which has relatively plenty of storage space, while the roof airbag for protecting the head of the occupant, which has a relatively small volume, is stored in the roof which has a limited storage space. Thus the occupant protection device of the invention is able to be mounted on the vehicle with no concern for a storage space. Moreover, the occupant protection device of the invention is configured such that the roof airbag is deployed between the front airbag and occupant. With this configuration, the occupant protection device of the invention is able to protect the occupant smoothly by arresting the head of the occupant with the roof airbag quickly and arresting the upper body by the front airbag.

Therefore, the occupant protection device of the invention can be mounted on the vehicle despite the limited storage space of the vehicle, and is able to protect the occupant smoothly.

In the occupant protection device of the invention, it is desired that the roof airbag device is configured to be actuated generally simultaneously with a detection of the impact and complete deployment of the roof airbag before the front airbag completes deployment. With the occupant protection device thus configured, the roof airbag catches the head of the occupant first, decelerates a forward movement of the upper body of the occupant, then the front airbag catches the upper body as decelerated. Thus the occupant protection device is able to arrest the occupant adequately while suppressing his forward movement.

In the occupant protection device of the invention, it is desired that the roof airbag as fully inflated has such a contour that a width thereof in a front and rear direction is great in an upper end portion thereof and reduces toward a lower end thereof. With this configuration, the roof airbag as deployed will be prevented from being pushed rearward on the lower end by the front airbag as deployed.

In the occupant protection device of the invention, it is further desired that the roof airbag includes, in a rear upper end portion thereof as deployed, a mounting region to the roof. With this configuration, when the roof airbag as fully inflated receives the occupant's head on the rear surface, a front upper end region of the roof airbag which is disposed in front of the mounting region to the roof will be supported by the roof, which will prevent a lower end portion of the roof airbag from moving or swinging forward considerably, such that the roof airbag will arrest the head adequately.

The occupant protection device of the invention may also be configured such that a front surface of the roof airbag as deployed is brought into contact with a rear surface of the front airbag as deployed, and to include a recessed region and a protruding region that are disposed in the front surface of the roof airbag and in the rear surface of the front airbag and fit each other at full deployment of the front airbag and roof airbag so as to prevent the roof airbag from moving in an up and down direction and/or in a left and right direction with respect to the front airbag.

This configuration will prevent the roof airbag from moving in the up and down direction and/or in the left and right direction with respect to the front airbag when the roof airbag catches the head of the occupant, thus the roof airbag will be able to arrest the head in a steady fashion.

The occupant protection device of the invention may alternatively be configured such that the roof airbag includes, in a lower end portion thereof as deployed, a protrusive inflatable region that protrudes forward and is disposed beneath a rear lower end of the front airbag as deployed. With this configuration, due to engagement between the protrusive inflatable region and rear lower end of the front airbag, the roof airbag will be adequately prevented from bouncing back upward immediately after deployment. Therefore, the roof airbag will be able to protect the head of the occupant quickly and adequately.

The occupant protection device of the invention may further alternatively be configured such that:

the front airbag device and the roof airbag device are configured to be actuated also when an impact is applied to the vehicle from a diagonally forward direction; and the front airbag includes a pair of protrusive inflatable regions that are disposed at a left end region and a right end region of a rear portion of the front airbag as deployed and protrude rearward.

With this configuration, the occupant protection device will be able to arrest and protect the occupant's head with the protrusive inflatable regions when the occupant moves diagonally forward in the event of an oblique collision or an offset collision. Such protrusive inflatable regions may also be formed on the roof airbag, instead of the front airbag.

Further alternatively, the occupant protection device may further include a window airbag device that is adapted to be mounted in an upper periphery of a window disposed at a side of the front seat and actuated when an impact is applied to the vehicle from a side or from a diagonally forward direction. The window airbag device deploys a window airbag over an inboard side of the window. The roof airbag device is also configured to be actuated when an impact is applied to the vehicle from a side or from a diagonally forward direction, and deploy the roof airbag such that an outboard-side edge of the roof airbag is brought into contact with the window airbag.

With this configuration, with the outboard-side edge portion supported by the window airbag, the roof airbag will be prevented from slipping towards an outboard direction at deployment, thus able to protect the head of the occupant as he moves diagonally forward towards the outboard direction in the event of an oblique collision or an offset collision.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Each of occupant protection devices embodying the invention are adapted to be mounted on a vehicle V for protecting an occupant MP siting in a passenger seat (as a front seat) PS. An occupant protection device M1 according to a first embodiment of the invention includes a front airbag device 10 which is adapted to be disposed in front of the passenger seat or front seat PS, and a roof airbag device 25 which is adapted to be mounted on a portion of a roof 6 of the vehicle V between the front airbag device 10 and the passenger seat PS.

Unless otherwise specified, front/rear, up/down and left/right directions in this specification are intended to refer to front/rear, up/down and left/right directions of the vehicle V.

Figure 1:
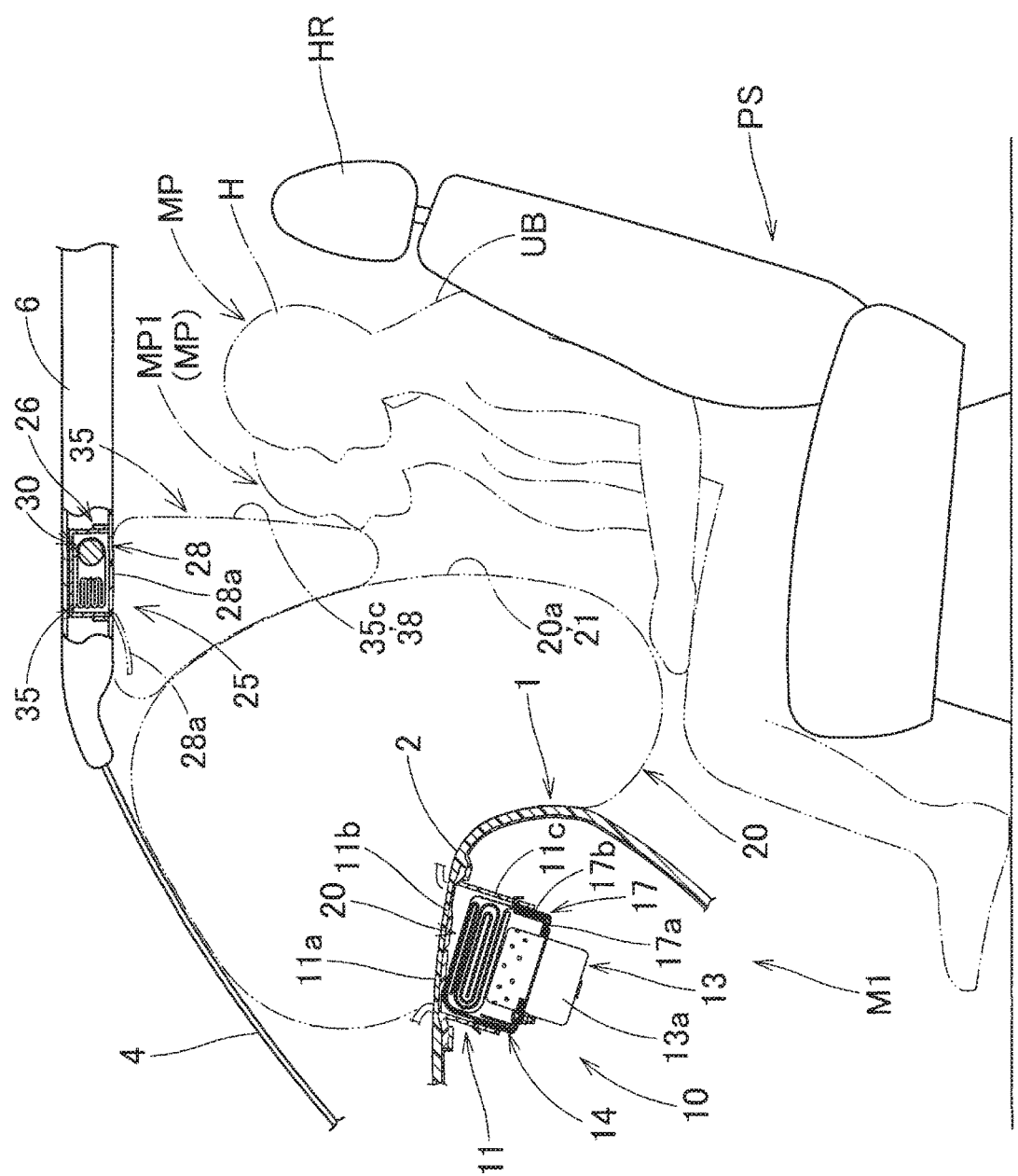
FIG. 1 is a schematic sectional view of an occupant protection device according to a first embodiment of the invention as mounted on a vehicle.

The front airbag device 10 is mounted on an underside of a top plane 2 of an instrument panel (or dashboard) 1 in front of the passenger seat PS as can be seen in FIG. 1, and includes a front airbag 20, which is in a folded configuration, an inflator 13 for feeding the front airbag 20 with an inflation gas, a case 17 for storing and holding the airbag 20 and inflator 13, a retainer 14 which is used to mount the airbag 20 and inflator 13 on the case 17, and an airbag cover 11 for covering the front airbag 20.

The airbag cover 11 is integral with the dashboard 1 fabricated of synthetic resin. The airbag cover 11 includes a front door 11a and a rear door 11b which are designed to open when pushed by the front airbag 20 at airbag deployment. The airbag cover 11 further includes, around the doors 11a and 11b, a joint wall 11c which is coupled with the case 17.

As can be seen in FIG. 1, the inflator 13 includes a body 13a which is formed into a pot-like shape. The inflator 13 is electrically connected to a suitable control (not-shown) with a not-shown lead wire, and is designed to be actuated in response to an actuating signal fed from the control which has detected a front collision of the vehicle V, i.e. when an impact is applied to the vehicle V from forward. The inflator 13 of the illustrated embodiment is designed to be actuated when 10 ms have elapsed after detection of the front collision of the vehicle V.

The case 17 is formed of a sheet metal into a generally square parallelepiped which has a rectangular opening at the top. As can be seen in FIG. 1, the case 17 includes a generally rectangular bottom wall 17*a* on which the inflator 13 is mounted from below, and a circumferential wall 17*b* which extends upward from an outer circumferential edge of the bottom wall 17*a* for engagement with the joint wall 11 of the airbag cover 11. In the front airbag device 10 of the illustrated embodiment, the front airbag 20 and inflator 13 are mounted on the bottom wall 17*a* of the case 17 through the use of bolts 14*a* of the retainer 14 which is disposed inside the front airbag 20.

The front airbag 20 is formed of a flexible sheet material and inflatable with an inflation gas fed from the inflator 13. As can be seen in FIG. 1 (with double-dotted lines) and in FIG. 6, the front airbag 20 is designed to be deployed in such a manner as to fill a space between the top plane 2 of the dashboard 1 and a windshield 4 for catching an upper body UB of the occupant MP who moves forward. In the illustrated embodiment, the front airbag 20 is formed of a flexible fabric woven with polyester, polyimide yarns or the like. The front airbag 20 includes, in the rear surface 20*a* as deployed, an occupant-receiving wall 21 which catches and receives the upper body UB of the occupant MP. The occupant-receiving wall 21 is deployable at a slant relative to an up and down direction while curving and bulging rearward such that the lower end is located farther rearward than the upper end. The front airbag 20 is provided with a not-shown vent hole for releasing extra inflation gas in a predetermined portion except the occupant-receiving wall 21. The front airbag 20 has a volume of approximately 90 to 110 liter. The front airbag 20 is designed to protect the occupant MP adequately with the aid of reaction forces from the windshield 4 and dashboard 1 when catching the occupant MP at deployment.

As can be seen in FIG. 1, the roof airbag device 25 is adapted to be mounted on the roof 6 of the vehicle V. In the illustrated embodiment, more specifically, the roof airbag device 25 is mounted on such a position of the roof 6 as to be in front of the occupant MP1 (MP) sitting in the passenger seat PS. The roof airbag device 25 includes a roof airbag 35, which is folded up, an inflator 30 for feeding the roof airbag 35 with an inflation gas, a case 26 for storing the airbag 35 and inflator 30, and an airbag cover 28 for covering an opening of the case 26.

As can be seen in FIG. 1, the case 26 is disposed in a portion of the roof 6 in front of and proximate to a head H of the occupant MP1 sitting in the passenger seat PS. The case 26 is formed of a sheet metal into a generally box shape whose bottom is open and whose width in a left and right direction is greater than width in a front and rear direction. The case 26 is mounted on a rigid part of the vehicle V forming the roof 6 through the use of a predetermined bracket or the like. The airbag cover 28 of the illustrated embodiment is integral with an interior material of the roof 6, and includes a door 28*a* which is openable when pushed by the roof airbag 35 at airbag deployment.

Figure 3:
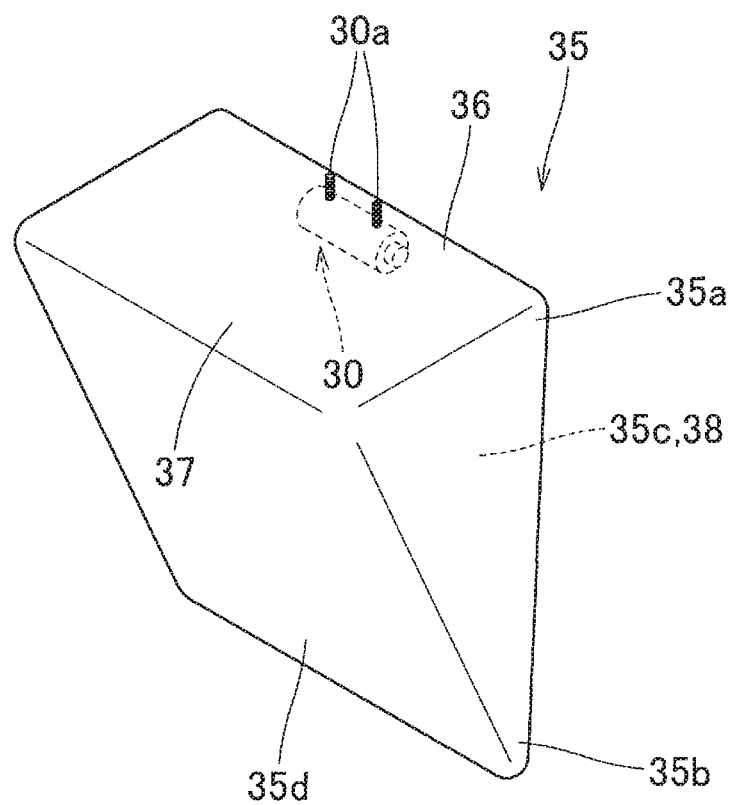
FIG. 3 is a schematic perspective view of the roof airbag of FIG. 2 as inflated by itself.

The inflator 30 of the illustrated embodiment is generally cylindrical in outer contour. Specifically, the inflator 30 includes a number of gas discharge ports (reference numeral omitted) in a first end region, and is coupled with the roof airbag 35. As can be seen in FIG. 3, the inflator 30 of the illustrated embodiment further includes two bolts 30*a* which serve as means for mounting on the case 26. The inflator 30 is stored inside the roof airbag 35 such that the bolts 30*a* protrude out of the roof airbag 35, and is mounted on the case 26 together with the roof airbag 35 through the use of the bolts 30*a*. The inflator 30 is electrically connected to the not-shown control with a not-shown lead wire so as to be actuated in response to an actuating signal fed from the control which has detected a front collision of the vehicle V, i.e. when an impact is applied to the vehicle V from forward. The inflator 30 of the illustrated embodiment is designed to be actuated generally simultaneously with the detection of a front collision of the vehicle V.

Figure 2:
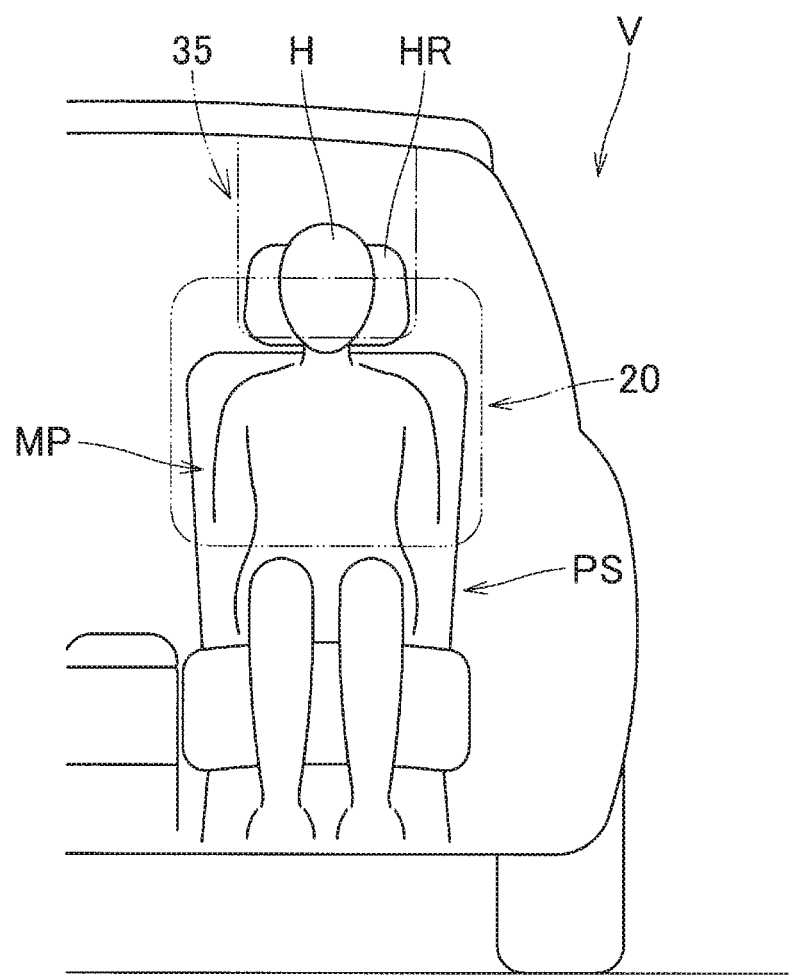
FIG. 2 schematically depicts a front airbag and a roof airbag of the occupant protection device according to the first embodiment as viewed from a front of the vehicle.
Figure 6:
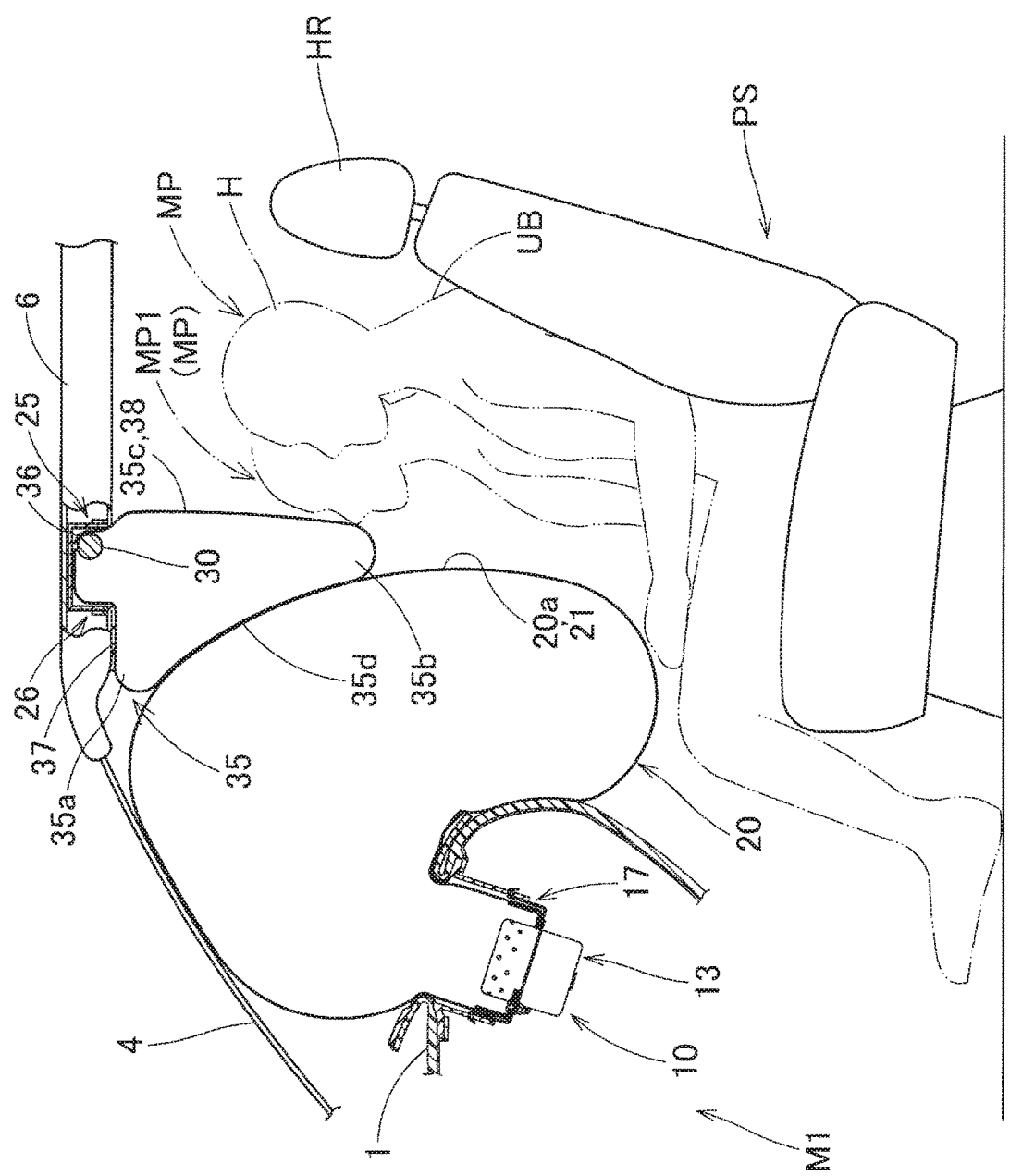
FIG. 6 is a schematic vertical sectional view of the occupant protection device of the first embodiment as the front airbag and roof airbag are deployed.

The roof airbag 35 is formed of a flexible sheet material and inflatable with an inflation gas fed from the inflator 30. As can be seen in FIG. 3, the roof airbag 35 is designed to be deployed in such a contour that is generally rectangular as viewed from a front and rear direction and is generally triangular as viewed from a left and right direction. As viewed from the left and right direction, more specifically, the roof airbag 35 has such a generally triangular contour that narrows towards a lower end 35*b* portion from an upper end 35*a* portion. In the illustrated embodiment, similarly to the front airbag 20, the roof airbag 35 is formed of a flexible fabric woven with polyester, polyamide yarns or the like. The roof airbag 35 includes, in the rear surface 35*c* as deployed, a head-receiving wall 38 which catches and receives the head H of the occupant MP. As can be seen in FIG. 6, the head-receiving wall 38 is deployable generally vertically in front of and in proximity to a front surface of the head H. Further, the roof airbag 35 is designed such that the front surface 35*d* is deployable diagonally rearward and downward so as to generally fit the rear surface 20*a* of the front airbag 20 as deployed in contour. The roof airbag 35 further includes a mounting region 36 in a rear upper end portion, which is proximate to an upper end of the head-receiving wall 38. The roof airbag 35 is mounted on the case 26 by the mounting region 36 through the use of the inflator 30. As indicated with double-dotted lines in FIG. 2, a width in a left and right direction of the roof airbag 35 as deployed is generally identical to that of a head rest HR of the passenger seat PS. That is, the width in the left and right direction of the roof airbag 35 as deployed is greater than that of the head H of the occupant MP. A width in an up and down direction of the roof airbag 35 as deployed is such that the lower end 35*b* as deployed is disposed in a vicinity of a lower end of the head rest HR, as can be seen in FIG. 1 and FIG. 2 (with double-dotted lines). In the illustrated embodiment, the roof airbag 35 is further provided with a not-shown vent hole for releasing extra inflation gas in a predetermined portion except the head-receiving wall 38. A volume of the roof airbag 35 of the illustrated embodiment is approximately 15 liter.

In operation of the occupant protection device M1 of the first embodiment, when a front collision of the vehicle V is detected, the inflator 30 of the roof airbag device 25 is actuated instantly to inflate the roof airbag 35, such that the roof airbag 35 protrudes downwardly from an opening of the case 26 formed by opening of the door 28*a* of the airbag cover 28, and is deployed. When a predetermined time period elapsed after the actuation of the inflator 30, the inflator 13 of the front airbag device 10 is actuated, and inflates the front airbag 20. The front airbag 20 then protrudes from the opening of the case 17 formed by opening of the doors 11*a* and 11*b* of the airbag cover 11, and is deployed rearward and upward. As can be seen in FIG. 1

(double-dotted lines) and FIG. 6, the front airbag 20 is deployed in such a manner as to fill the space between the top plane 2 of the dashboard 1 and windshield 4, and the roof airbag 35 is deployed in such a manner as to cover the front surface of the head H of the occupant MP sitting in the passenger seat PS.

The occupant protection device M1 according to the first embodiment of the invention includes the roof airbag device 25 which is mounted on the roof 6 and the front airbag device 10 which is mounted in front of the passenger seat (front seat) PS. The front airbag 20 is designed to protect the upper body UB of the occupant MP while the roof airbag 35 is designed to protect the head H of the occupant MP. That is, the occupant protection device M1 is designed such that the front airbag 20, which is deployed over a wide area in front of the upper body UB and thus has a big volume, is stored in an area in front of the passenger seat PS which has relatively plenty of storage space, while the roof airbag 35 for protecting the head H of the occupant MP, which has a relatively small volume, is stored in the roof 6 which has a limited storage space. Thus the occupant protection device M1 is able to be mounted on the vehicle V with no concern for a storage space. Moreover, the occupant protection device M1 of the first embodiment is designed such that the roof airbag 35 is deployed between the front airbag 20 and occupant MP. With this configuration, the occupant protection device M1 is able to protect the occupant MP smoothly by arresting the head H of the occupant MP with the roof airbag 35 quickly and arresting the upper body UB by the front airbag 20.

Therefore, the occupant protection device M1 of the first embodiment is able to be mounted on the vehicle despite a limited storage space of the vehicle and is able to protect the occupant MP smoothly.

Figure 4A:
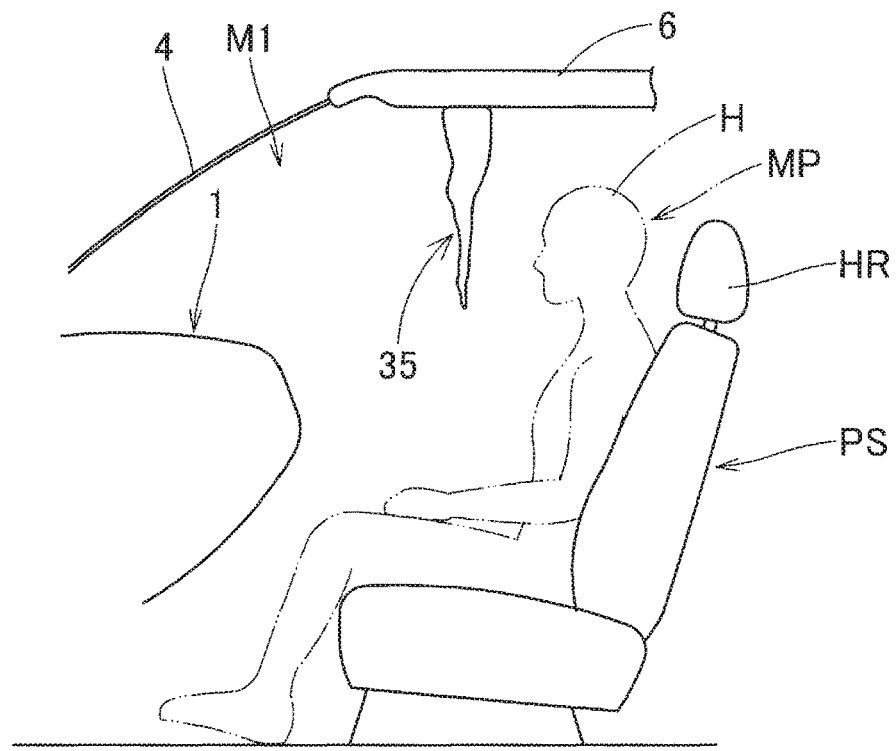
FIGS. 4A, 4B and 5 illustrate a behavior of the occupant protection device of the first embodiment as actuated, from a side view.
Figure 4B:
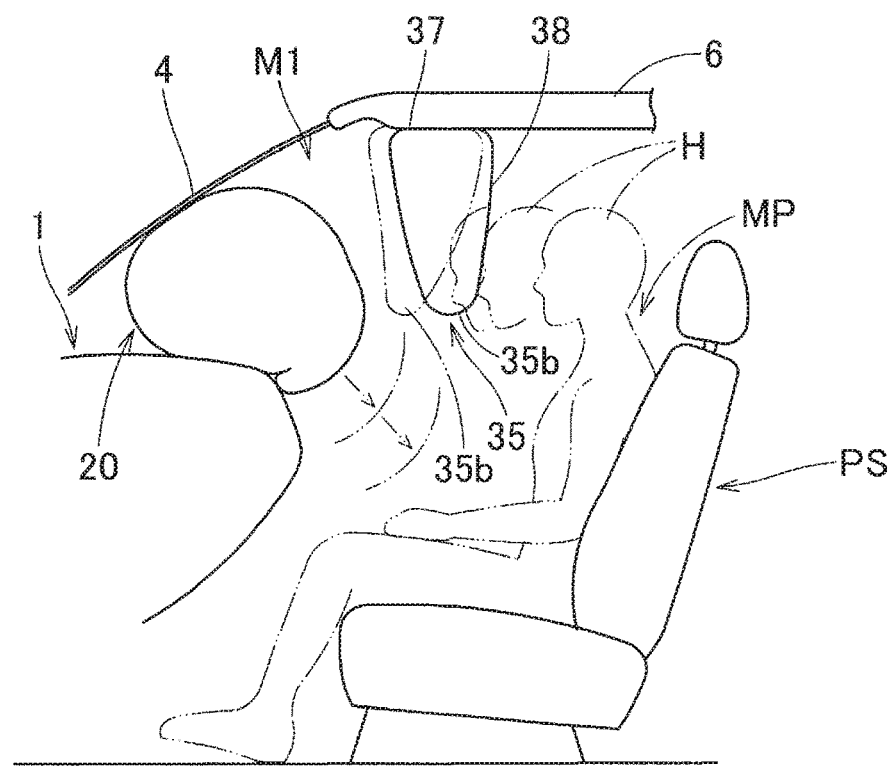
Figure 5:
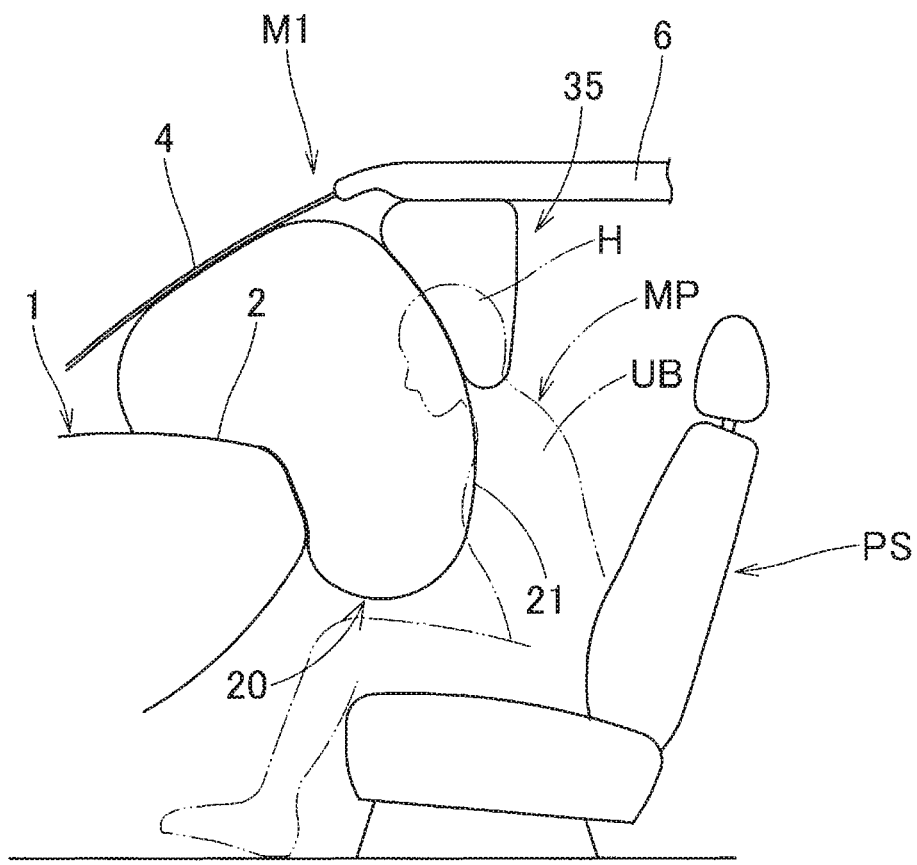

In the occupant protection device M1 of the first embodiment, the roof airbag device 25 is configured to be actuated generally simultaneously with the detection of an impact occurring in a front portion of the vehicle V and complete inflation and deployment of the roof airbag 35 before the front airbag 20 completes inflation and deployment. With the occupant protection device M1 thus configured, the roof airbag 35 arrests the head H of a forward-moving occupant MP first, decelerates a forward movement of the upper body UB of the occupant MP, then the front airbag 20 arrests the upper body UB as decelerated. Thus the occupant protection device M1 is able to arrest the occupant MP adequately while suppressing his forward movement. More specifically, as can be seen in FIG. 4A, the roof airbag 35 is inflated with an inflation gas and deployed in front of the head H immediately after a front collision of the vehicle V. Since the inflator 13 of the front airbag device 10 is configured to be actuated 10 ms after detection of the front collision, the front airbag 20 is still in the middle of inflation and deployment when the roof airbag 35 completes deployment, as can be seen in FIG. 4B. The roof airbag 35 thus deployed arrests the head H of the occupant MP as he moves forward with the upper body UB facing forward. By the time the occupant MP then goes through under the roof airbag 35 and his upper body UB further moves forward, the front airbag 20 has completed inflation and deployment, thus is able to arrest the upper body UB as a whole smoothly, as can be seen in FIG. 5. The roof airbag 35 of the illustrated embodiment is able to absorb a kinetic energy of the forward-moving occupant MP also with a frictional resistance which occurs when the head H goes through under the roof airbag 35. In the occupant protection device M1 of the illustrated embodiment, furthermore, the volume of the front airbag 20 is approximately 90 to 110 liter, which is generally identical to an airbag of an airbag device (an airbag device for a passenger seat) which is not accompanied by a roof airbag. With this configuration, even if the inflator 30 fails to deploy the roof airbag 35 quickly enough upon a front collision of the vehicle V, the upper body UB of the occupant MP will be protected merely by the front airbag 20.

In the occupant protection device M1 of the first embodiment, the roof airbag 35 is designed to be inflated into such a contour that the width in the front and rear direction is great in the upper end portion 35a and reduces toward the lower end 35b. With this configuration, the roof airbag 35 as deployed will be prevented from being pushed rearward on the lower end 35b by the front airbag 20 as deployed. In the occupant protection device M1, especially, the roof airbag 35 is designed such that the rear surface 35c as deployed extends generally vertically while the front surface 35d gradually recedes rearward and downward so as to generally fit the rear surface 20a of the front airbag 20 as deployed in contour. This configuration will prevent the roof airbag 35 from being pushed by the front airbag 20 and deformed. If such an advantageous effect does not have to be considered, the roof airbag may be formed into a plain board shape whose thickness in a front and rear direction is generally uniform from the upper end to the lower end. The roof airbag may also be formed into such a contour that the width in the front and rear direction reduces toward the lower end from the upper end and the rear surface is so diagonal that the lower end is located farther forward than the upper end.

Moreover, in the occupant protection device M1 of the first embodiment, the roof airbag 35 is designed to be mounted on the roof 6 of the vehicle V by the rear upper end portion as inflated (i.e. by the mounting region 36). With this configuration, when the roof airbag 35 as fully inflated receives the occupant's head H on the rear surface 35c (i.e. on the head-receiving wall 38), a front upper end region of the roof airbag 35 which is disposed in front of the mounting region 36, namely a support region 37, will be supported by the roof 6 as can be seen in FIG. 4B, which will prevent the lower end 35b portion from moving or swinging forward considerably, such that the roof airbag 35 will arrest the head H adequately. If such an advantageous effect does not have to be considered, the roof airbag may be mounted on the roof by the front upper region as inflated.

In the occupant protection device M1 of the first embodiment, furthermore, the roof airbag 35 includes a not-shown vent hole for releasing an extra inflation gas at deployment. With this configuration, the lower end 35b of the roof airbag 35 will smoothly lead to the rear surface 20a (i.e. the occupant-receiving wall 21) of the front airbag 20, such that the occupant-receiving wall 21 of the front airbag 20 will catch the upper body UB of the occupant MP smoothly after the roof airbag 35 catches the head H of the occupant MP.

Figure 7:
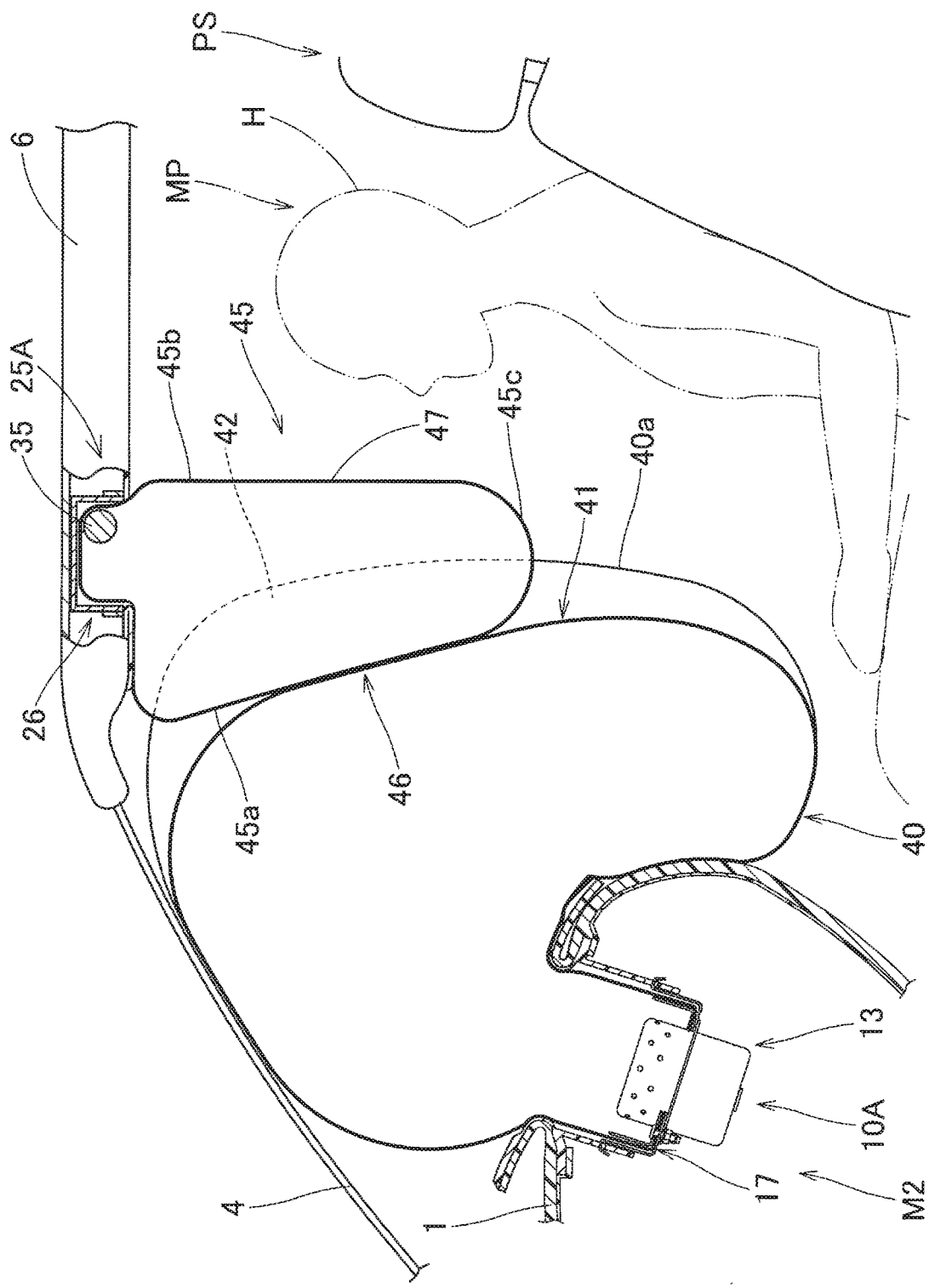
FIG. 7 is a schematic vertical sectional view of an occupant protection device according to a second embodiment of the invention as a front airbag and a roof airbag are deployed.
Figure 8:
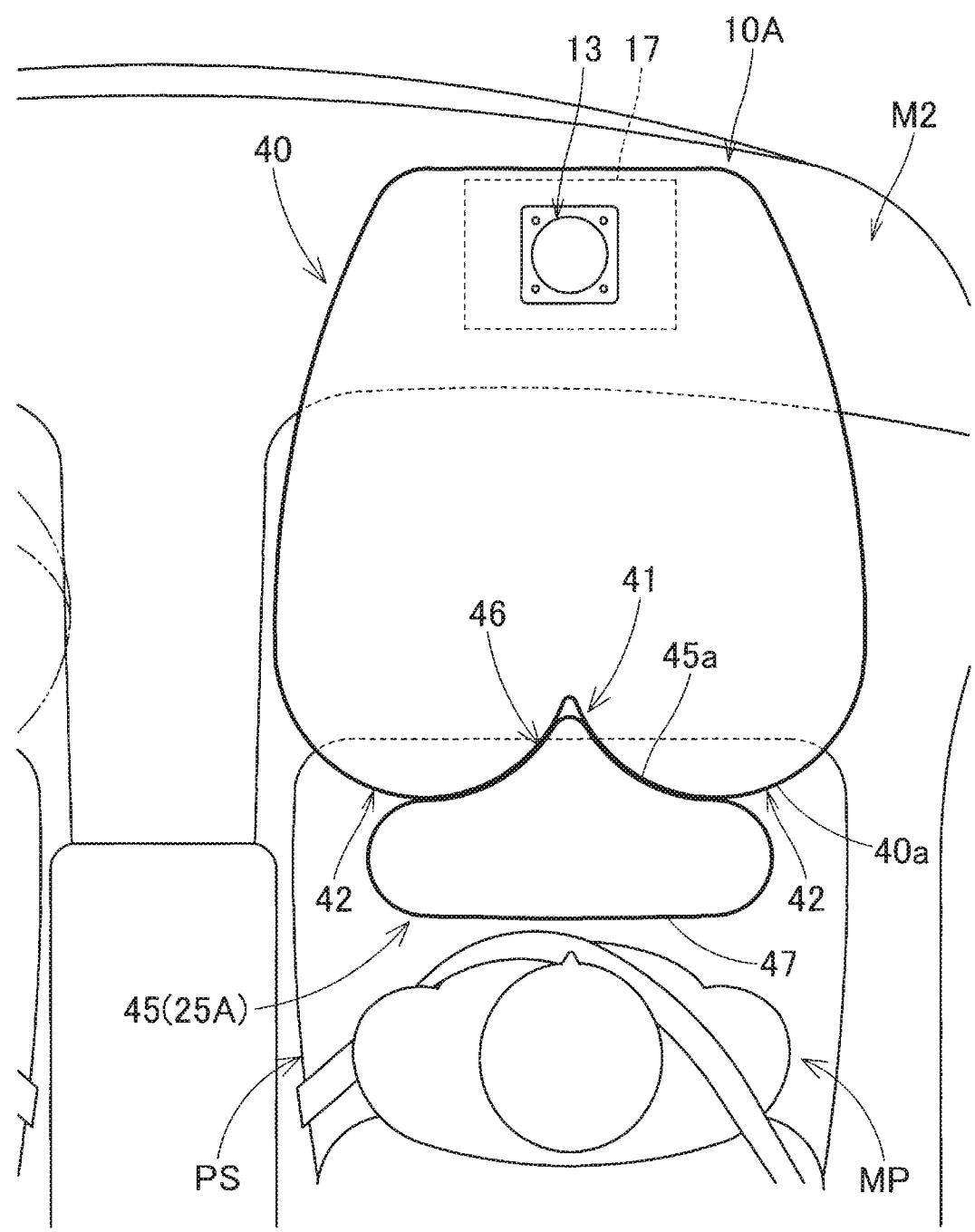
FIG. 8 is a schematic horizontal sectional view of the occupant protection device of FIG. 7 as the front airbag and the roof airbag are deployed.

A second embodiment of the invention is now described referring to FIGS. 7 and 8. An occupant protection device M2 according to the second embodiment has identical configurations to the occupant protection device M1 of the first embodiment except a front airbag 40 of a front airbag device 10A and a roof airbag 45 of a roof airbag device 25A. Accordingly, detailed descriptions of common members will be omitted.

The front airbag 40 has similar configurations to the front airbag 20 of the occupant protection device M1 of the first embodiment except in that the rear surface as deployed has an uneven contour. As can be seen in FIGS. 7 and 8, the front airbag 40 of the second embodiment includes a recessed region 41 that is recessed forward in a central region in a left and right direction of the rear surface 40a as deployed, and a pair of raised regions 42 that are disposed on a left side and a right side of the recessed region 41 and raised rearward relative to the recessed region 41. In the illustrated embodiment, as can be seen in FIG. 7, this unevenness caused by the recessed region 41 and raised regions 42 is greatest at a rear upper end region of the front airbag 40 which is positioned close to the roof airbag 45 when deployed, and converges towards the front end and towards the rear lower end as deployed.

The roof airbag 45 is designed to be brought into contact with the rear surface 40a of the front airbag 40 as deployed by the front surface 45a when deployed. The roof airbag 45 includes, in the front surface 45a as deployed, a protruding region 46 that fits in the recessed region 41 of the front airbag 40. When the roof airbag 45 is completely deployed, the protruding region 46 fits in the recessed region 41 of the front airbag 40 and prevents the roof airbag 45 from moving in a left and right direction with respect to the front airbag 40. More specifically, as can be seen in FIG. 8, the protruding region 46 is deployable into such a contour that tapers towards the front at a central region in the left and right direction of the roof airbag 45 as fully inflated so as to fit the recessed region 41 of the front airbag 40 as fully inflated. The roof airbag 45 has similar configurations to the roof airbag 35 of the first embodiment except in having the protruding region 46 in the front surface 45a. The rear surface 45b of the roof airbag 45 serves as a head-receiving wall 47 which catches and receives the head H of an occupant MP.

The occupant protection device M2 of the second embodiment is also designed such that the front airbag 40, which is deployed over a wide area in front of the upper body UB of an occupant MP and thus has a big volume, is stored in an area in front of the passenger seat PS which has relatively plenty of storage space, while the roof airbag 45 for protecting the head H of the occupant MP, which has a relatively small volume, is stored in the roof 6 which has a limited storage space. Thus the occupant protection device M2 is able to be mounted on the vehicle V with no concern for a storage space. Moreover, the occupant protection device M2 of the second embodiment is also designed such that the roof airbag 45 is deployed between the front airbag 40 and occupant MP. With this configuration, the occupant protection device M2 is able to protect the occupant MP smoothly by arresting the head H of the occupant MP with the roof airbag 45 quickly and arresting the upper body UB by the front airbag 40.

Moreover, the occupant protection device M2 of the second embodiment includes, in the front surface 45a of the roof airbag 45 as fully deployed, the protruding region 46 that fits the recessed region 41 of the front airbag 40 as fully deployed. Since the protruding region 46 is formed to extend generally vertically, it prevents the roof airbag 45 from moving in a left and right direction with respect to the front airbag 40 when the roof airbag 45 catches the head H of an occupant MP, thus the roof airbag 45 is able to arrest the head H in a steady fashion.

In the occupant protection device M2 of the second embodiment, the recessed region 41 of the front airbag 40 and protruding region 46 of the roof airbag 45 are formed to extend generally vertically when deployed in order to prevent the roof airbag 45 from moving in a left and right direction with respect to the front airbag 40. However, the contours of the recessed region and protruding region formed in the front airbag and roof airbag should not be limited thereby. By way of example, the recessed region may be formed in the roof airbag while the protruding region engageable with the recessed region in the front airbag. Alternatively, the recessed region and the protruding region may be formed to extend generally in a left and right direction in the front airbag and roof airbag so as to prevent the roof airbag from moving in an up and down direction with respect to the front airbag. Further alternatively, the recessed region and protruding region may be formed in the rear surface of the front airbag and in the front surface of the roof airbag such that the roof airbag is prevented from moving vertically and in a left and right direction with respect to the front airbag.

Figure 9:
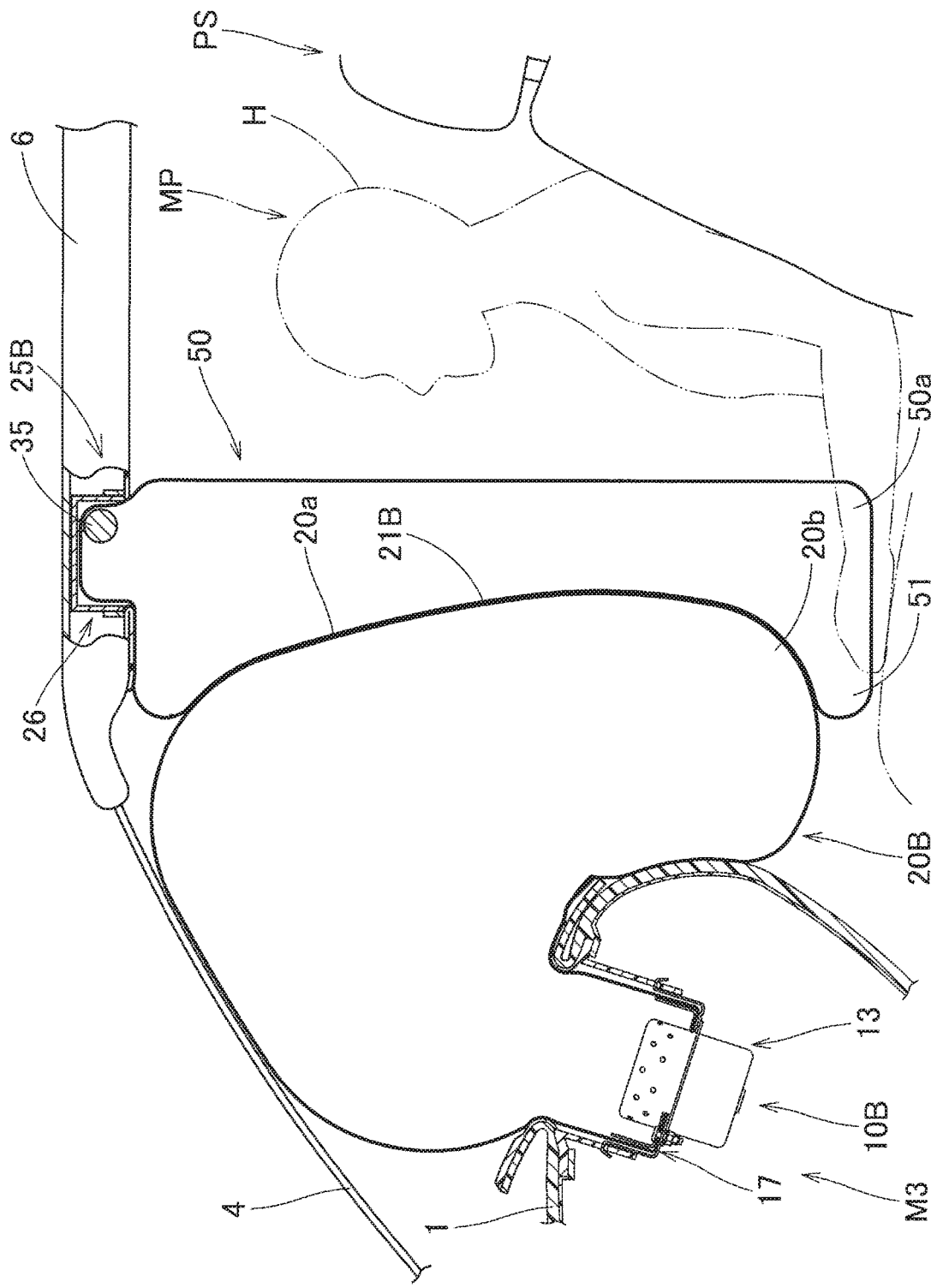
FIG. 9 is a schematic vertical sectional view of an occupant protection device according to a third embodiment of the invention as a front airbag and a roof airbag are deployed.

A third embodiment of the invention is now described referring to FIG. 9. In an occupant protection device M3 according to the third embodiment, a front airbag 20B of a front airbag device 10B has identical configurations to the front airbag 20 of the occupant protection device M1 according to the first embodiment. Therefore, detailed descriptions of common members will be omitted, and the common members will be given a symbol "B" at the end of common reference numerals. In the occupant protection device M3, a roof airbag 50 of a roof airbag device 25B includes, in the lower end 50a portion as deployed, a protrusive inflatable region 51 that protrudes forward. More specifically, the roof airbag 50 is designed such that the lower end 50a as deployed is disposed farther downward than a rear lower end 20b of a front airbag 20B as deployed, and that the protrusive inflatable region 51 is disposed beneath the rear lower end 20b of the front airbag 20B as deployed. The protrusive inflatable region 51 as deployed is designed to be engageable with the rear lower end 20b of the front airbag 20B as deployed.

The occupant protection device M3 of the third embodiment is also designed such that the front airbag 20B, which is deployed over a wide area in front of the upper body UB of an occupant MP and thus has a big volume, is stored in an area in front of the passenger seat PS which has relatively plenty of storage space, while the roof airbag 50 for protecting the head H of the occupant MP, which has a relatively small volume, is stored in the roof which has a limited storage space. Thus the occupant protection device M3 is able to be mounted on the vehicle V with no problems of storage-space constraint. Moreover, the occupant protection device M3 of the third embodiment is also designed such that the roof airbag 50 is deployed between the front airbag 20B and occupant MP. With this configuration, the occupant protection device M3 is able to protect the occupant MP smoothly by arresting the head H of the occupant MP with the roof airbag 50 quickly and arresting the upper body UB by the front airbag 20B.

In the occupant protection device M3 of the third embodiment, moreover, the roof airbag 50 includes the protrusive inflatable region 51 that protrudes forward from the lower end 50a and is disposed below the rear lower end 20b of the front airbag 20B as deployed. With this configuration, the roof airbag 50 will be adequately prevented from bouncing back upward immediately after deployment due to engagement between the protrusive inflatable region 51 and rear lower end 20b of the front airbag 20B. Therefore, the roof airbag 50 is able to protect the head H of the occupant MP quickly and adequately.

Figure 10:
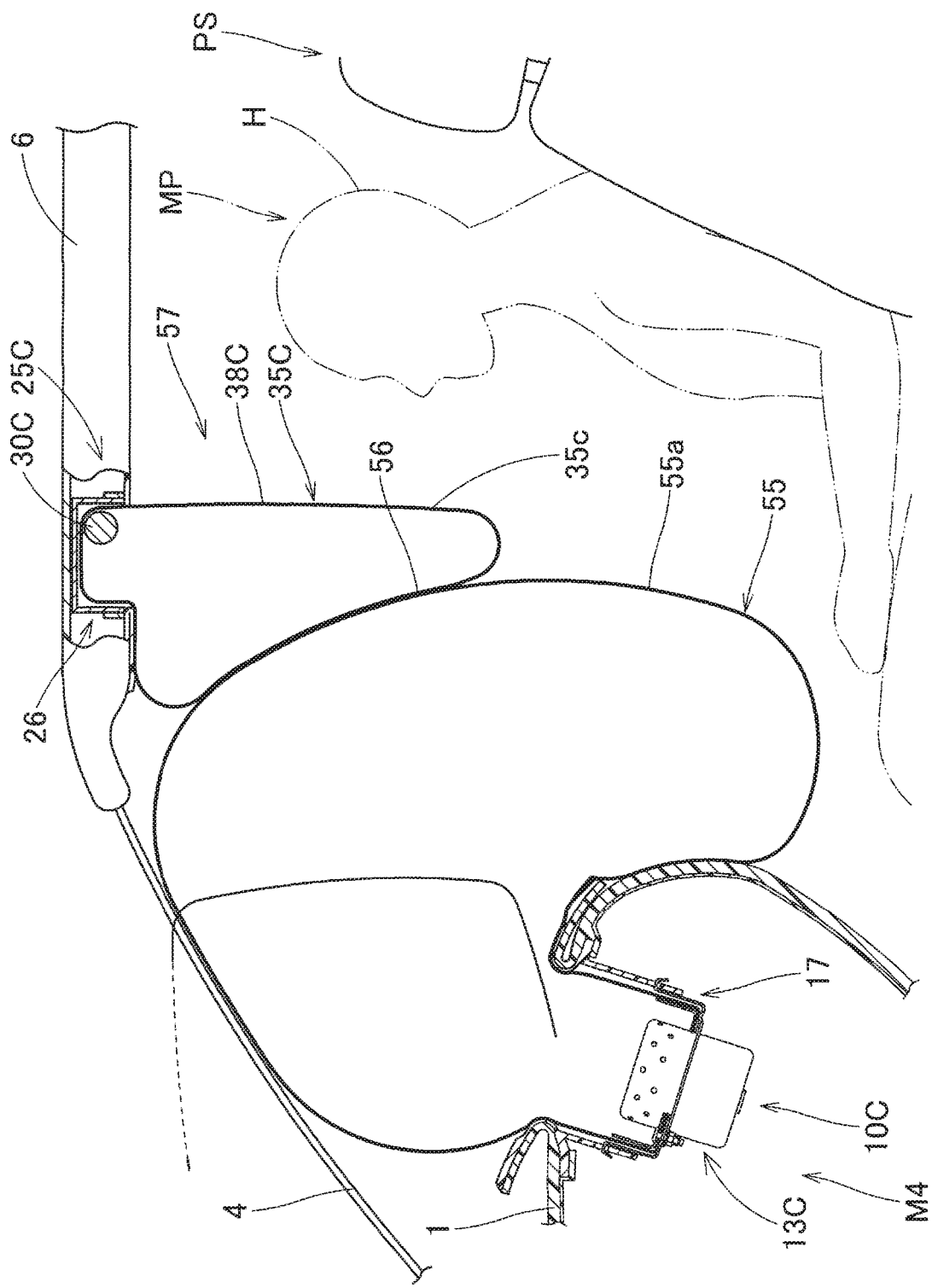
FIG. 10 is a schematic vertical sectional view of an occupant protection device according to a fourth embodiment of the invention as a front airbag and a roof airbag are deployed.
Figure 11:
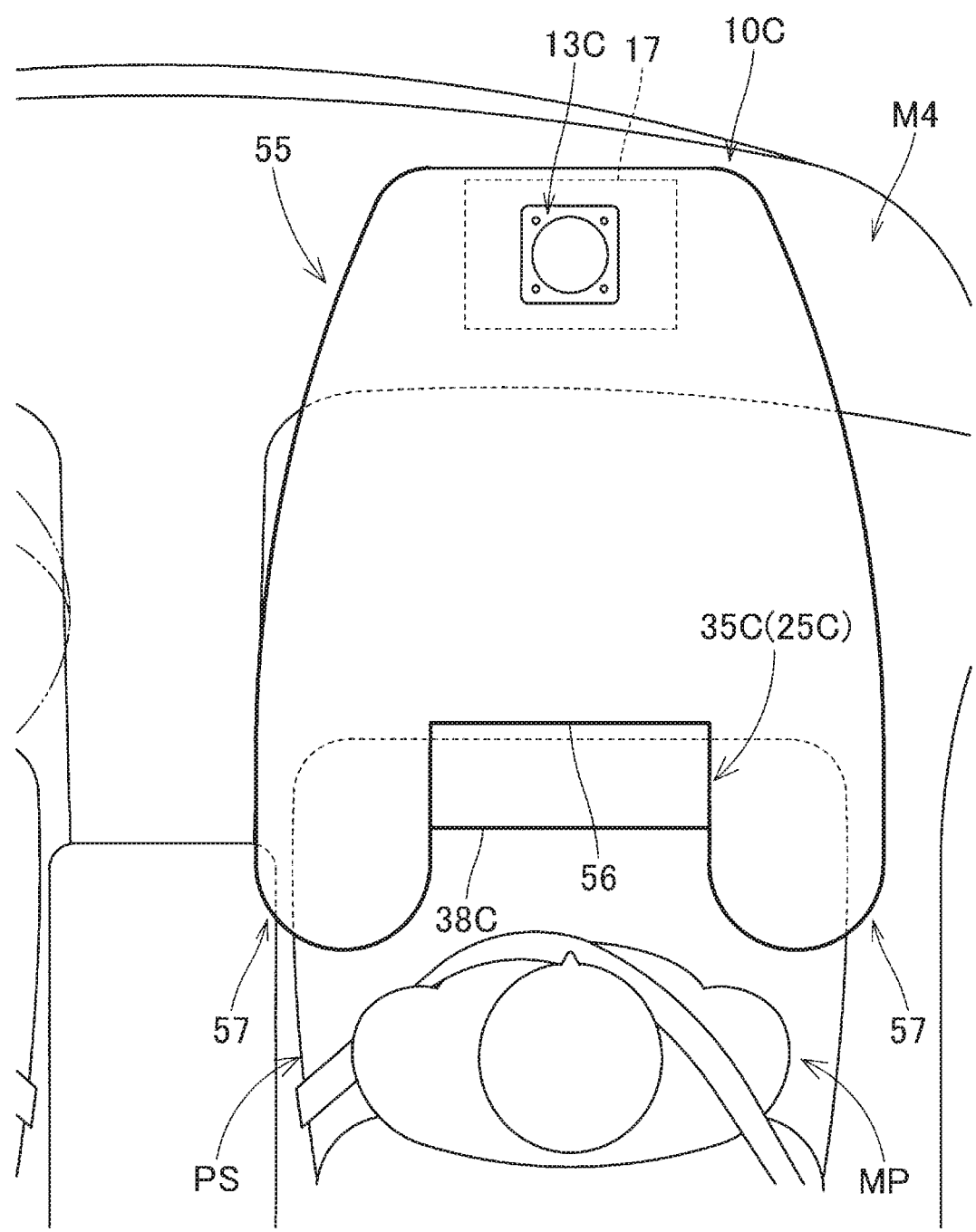
FIG. 11 is a schematic horizontal sectional view of the occupant protection device of FIG. 10 as the front airbag and the roof airbag are deployed.

A fourth embodiment of the invention is now described referring to FIGS. 10 and 11. In an occupant protection device M4 according to the fourth embodiment, an inflator 13C of a front airbag device 10C and an inflator 30C of a roof airbag device 25C are designed to be actuated in the event of an offset collision and an oblique collision of the vehicle V (i.e. when an impact is applied to the vehicle V from a diagonally forward direction) in addition to a frontal collision. In the occupant protection device M4, a front airbag 55 includes, in a rear surface 55a as deployed, an occupant-receiving wall 56 which catches and receives the upper body UB of a forward-moving occupant MP. The front airbag 55 further includes a pair of protrusive inflatable regions 57 which are disposed on a left side and a right side of the occupant-receiving wall 56 (i.e. in a left end portion and a right end portion of the rear surface 55a) and protrude rearwards at deployment. The roof airbag 35C is deployed between the protrusive inflatable regions 57, as can be seen in FIG. 11. The roof airbag 35C has similar configurations to the roof airbag 35 of the occupant protection device M1 of the first embodiment except in that a width in a left and right direction of the roof airbag 35C as deployed is so determined as to be disposed between the protrusive inflatable regions 57. That is, a front surface 35d of the roof airbag 35C is designed to generally fit the occupant-receiving wall 56 of the front airbag 55 as deployed in contour, and a rear surface 35c of the roof airbag 35C, which serves as a head-receiving wall 38C, is designed to be deployed generally vertically, as can be seen in FIG. 10. The protrusive inflatable regions 57 of the front airbag 55 protrude farther rearward than the head-receiving wall 38C of the roof airbag 35C for protecting the head H of an occupant MP who moves diagonally forward in the event of an offset collision or an oblique collision of the vehicle V.

The occupant protection device M4 of the fourth embodiment is also designed such that the front airbag 55, which is deployed over a wide area in front of the upper body UB of an occupant MP and thus has a big volume, is stored in an area in front of the passenger seat PS which has relatively plenty of storage space, while the roof airbag 35C for protecting the head H of the occupant MP, which has a relatively small volume, is stored in the roof which has a limited storage space. Thus the occupant protection device M4 is able to be mounted on the vehicle V with no problems of storage-space constraint. Moreover, the occupant protection device M4 of the fourth embodiment is also designed such that the roof airbag 35C is deployed between the front airbag 55 and occupant MP. With this configuration, the occupant protection device M4 is able to protect the occupant MP smoothly by arresting the head H of the occupant MP with the roof airbag 35C quickly and arresting the upper body UB by the front airbag 55.

Figure 12:
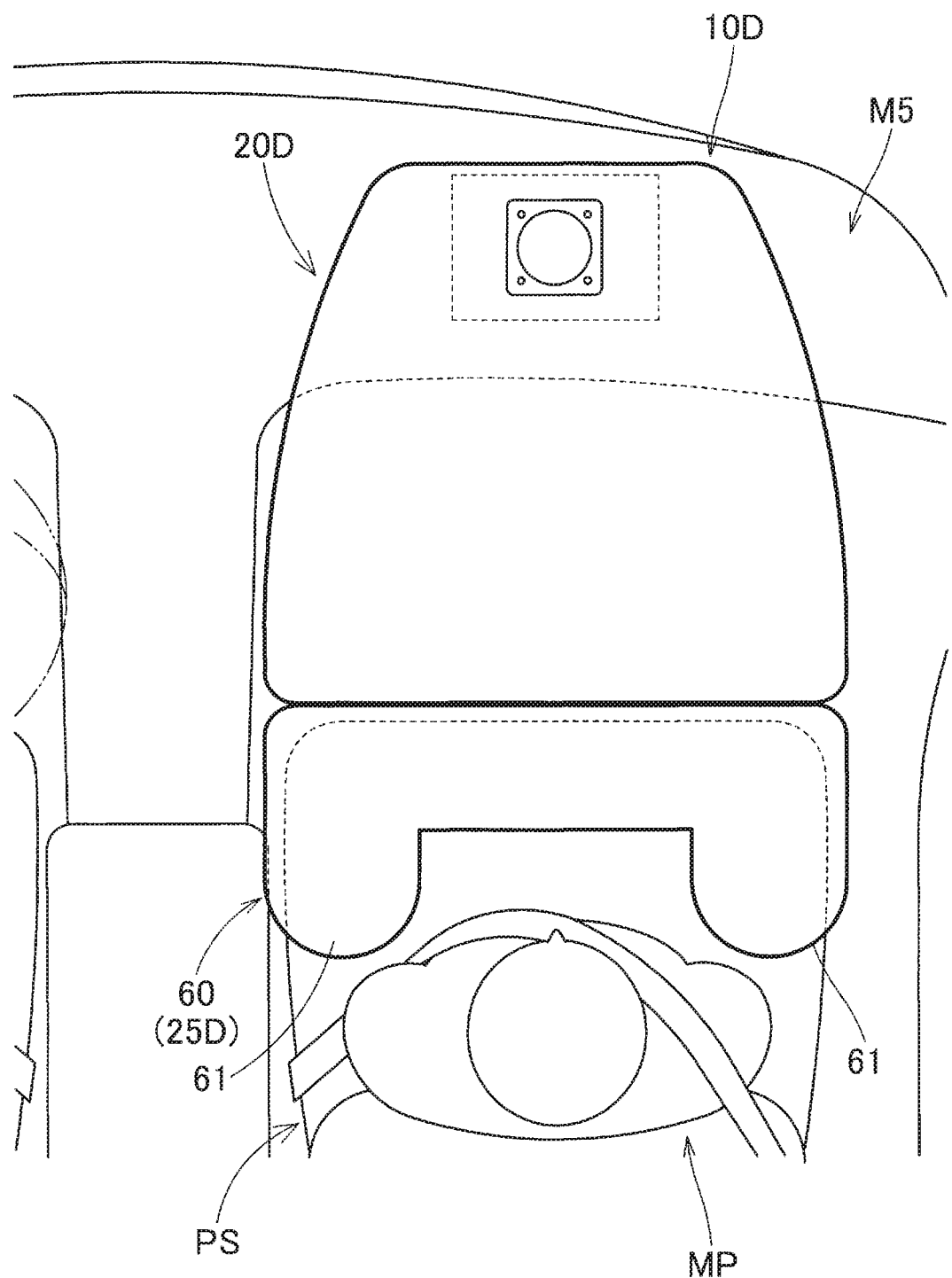
FIG. 12 is a schematic horizontal sectional view of an occupant protection device according to a fifth embodiment of the invention as a front airbag and a roof airbag are deployed.

Moreover, the occupant protection device M4 of the fourth embodiment is able to protect the occupant's head H which moves diagonally forward with the protrusive inflatable regions 57 of the front airbag 55, in the event of an oblique collision or an offset collision of the vehicle V. Such protrusive inflatable regions 57 may alternatively be formed in a roof airbag 60, not in a front airbag 20D, as can be seen in FIG. 12. In an occupant protection device M5 according to a fifth embodiment depicted in FIG. 12, the roof airbag 60 has a greater width in a left and right direction than those in the foregoing embodiments, and includes a pair of protrusive inflatable regions 61 that protrude rearward from the left and right end portions for protecting the occupant's head H as it moves diagonally forward.

Figure 13:
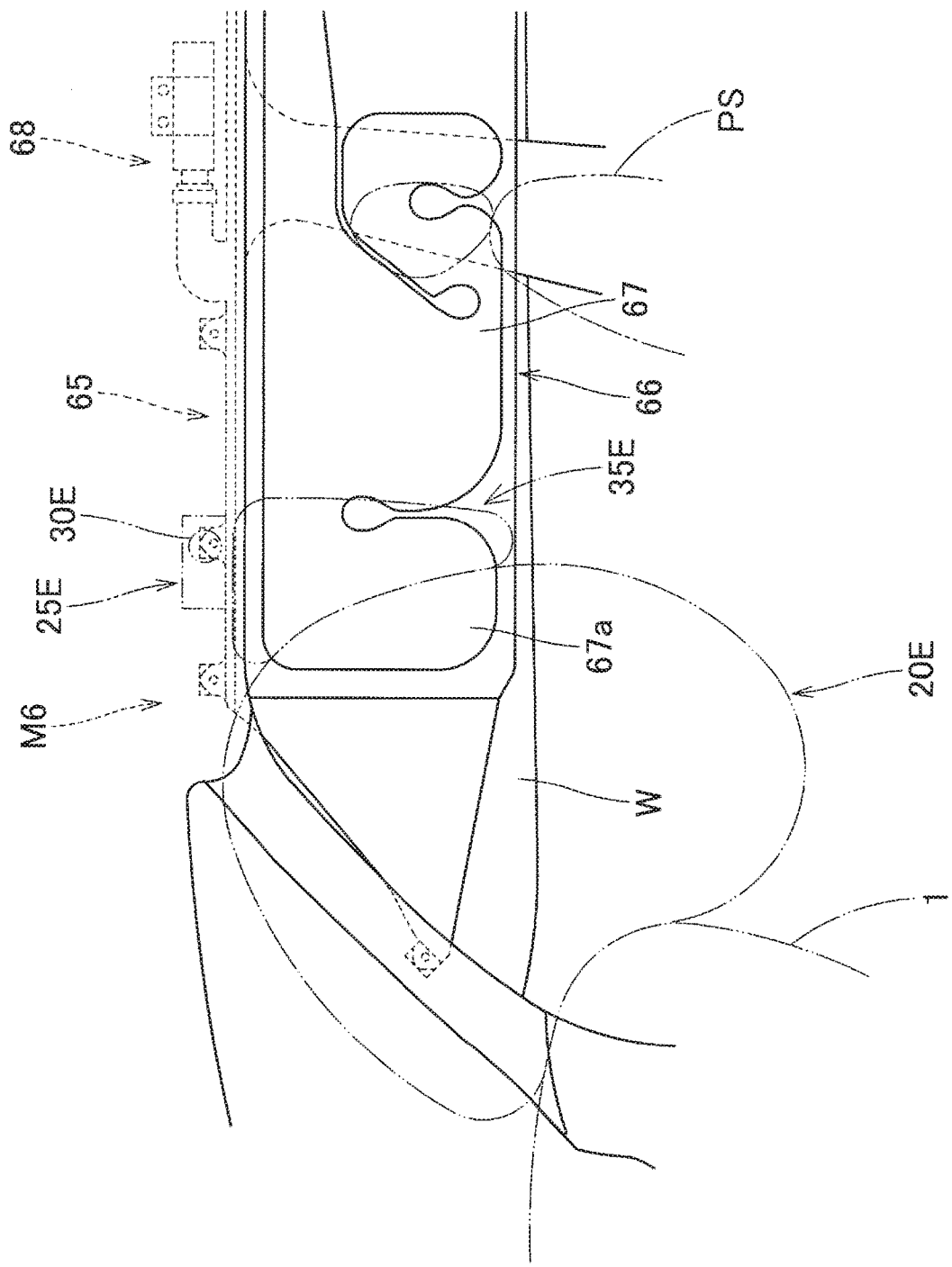
FIG. 13 is a side view of an occupant protection device according to a sixth embodiment of the invention as a window airbag is deployed.
Figure 14:
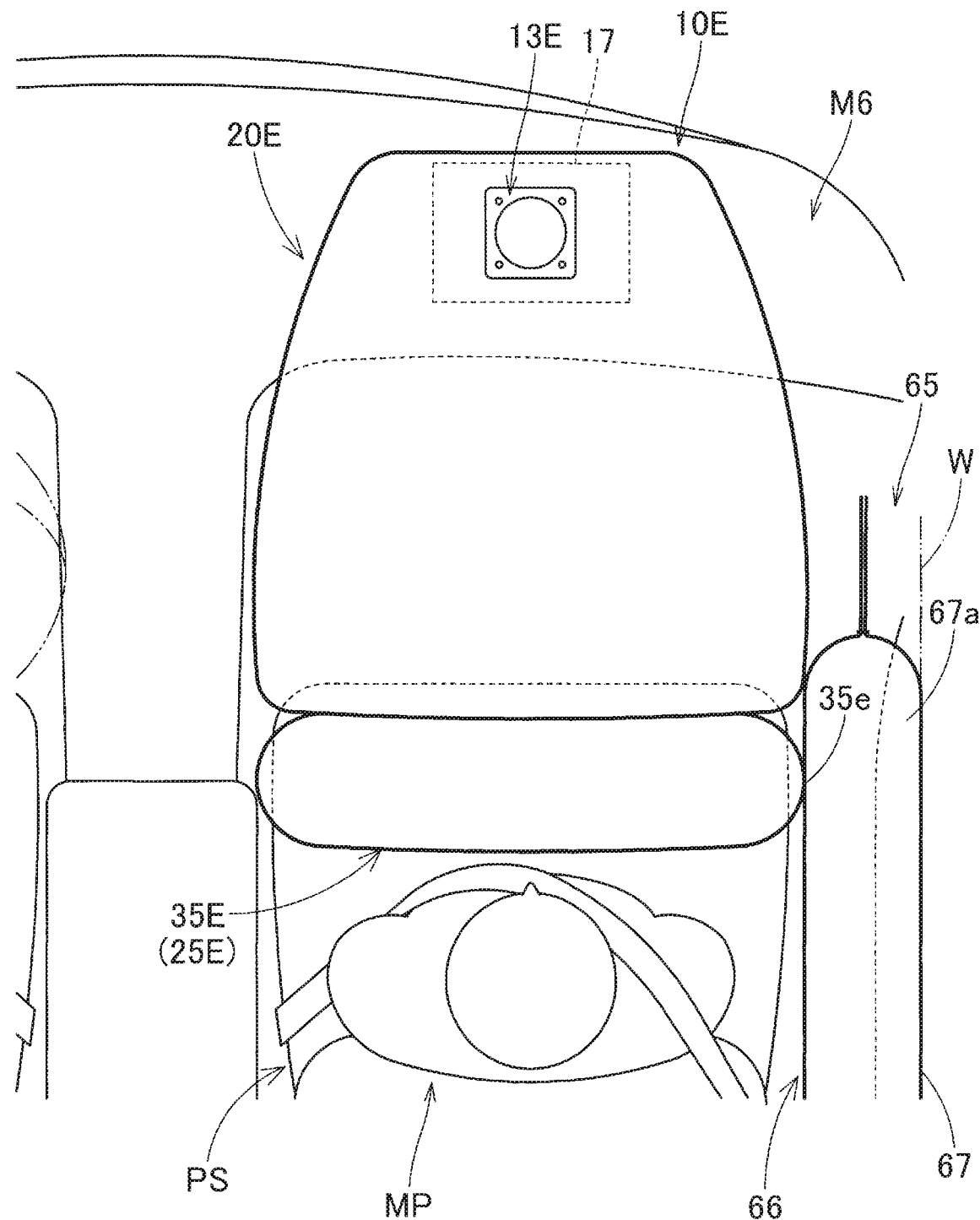
FIG. 14 is a schematic horizontal sectional view of the occupant protection device of FIG. 13 as the window airbag, a front airbag and a roof airbag are deployed.

A sixth embodiment of the invention is now described referring to FIGS. 13 and 14. An occupant protection device M6 according to the sixth embodiment includes a window airbag device 65 which includes a window airbag 66 deployable over an inboard side of a window W at a side of the passenger seat PS, in addition to a front airbag device 10E and a roof airbag device 25E. Also in the occupant protection device M6, an inflator 13E of the front airbag device 10E and an inflator 30E of the roof airbag device 25E are designed to be actuated in the event of an offset collision and an oblique collision of the vehicle V (i.e. when an impact is applied to the vehicle V from a diagonally forward direction) in addition to a frontal collision.

In the occupant protection device M6 of the sixth embodiment, the front airbag 20E has similar configurations to the front airbag 20 of the occupant protection device M1 of the first embodiment. The roof airbag 35E has similar configurations to the roof airbag 35 of the occupant protection device M1 except in that a width in a left and right direction of the roof airbag 35E as deployed is generally identical to that of the front airbag 20E, that is, greater than that of the roof airbag 35 of the first embodiment.

As shown in FIG. 13, the window airbag device 65 includes the window airbag 66 which is stored in an upper periphery of the window W in a folded configuration, and an inflator 68 for feeding the window airbag 66 with an inflation gas. The window airbag 66 is formed of a flexible sheet material, and rolled from the lower end on the outboard side for storage in the upper periphery of the window W, though not depicted in detail. As can be seen in FIG. 13, the window airbag 66 is inflated with an inflation gas fed from the inflator 68 and deployed over the window W. The window airbag 66 includes an inflatable region 67 which is inflatable with the inflation gas. As can be seen in FIGS. 13 and 14, the window airbag device 65 is designed such that a front end 67a of the inflatable region 67 of the window airbag 66 as fully deployed overlaps an inflated portion of the front airbag 20E, (in other words, such that the front end 67a of the inflatable region 67 is disposed farther forward than a rear surface 20a of the front airbag 20E), as viewed from an inboard-outboard direction (i.e. from a left and right direction). That is, the inflatable region 67 covers an outboard side of the roof airbag 35E. In the illustrated embodiment, the inflatable region 67 is deployed in contact with the front airbag 20E and roof airbag 35E between the window W and airbags 20E and 35E while covering the inboard side of the window W and outboard sides of the airbags 20E and 35E. That is, as shown in FIG. 14, an outboard-side edge (i.e. right edge) 35e of the roof airbag 35E as deployed is brought into contact with the window airbag 66 as deployed, in the illustrated embodiment. The inflator 68 of the window airbag device 65 is designed to be actuated in the event of a frontal collision, an oblique collision and an offset collision of the vehicle V, similarly to the inflator 13E of the front airbag device 10E and inflator 30E of the roof airbag device 25E.

The occupant protection device M6 of the sixth embodiment is also designed such that the front airbag 20E, which is deployed over a wide area in front of the upper body UB of an occupant MP and thus has a big volume, is stored in an area in front of the passenger seat PS which has relatively plenty of storage space, while the roof airbag 35E for protecting the head H of the occupant MP, which has a relatively small volume, is stored in the roof which has a limited storage space. Thus the occupant protection device M6 is able to be mounted on the vehicle V with no problems of storage-space constraint. Moreover, the occupant protection device M6 of the sixth embodiment is also designed such that the roof airbag 35E is deployed between the front airbag 20E and occupant MP. With this configuration, the occupant protection device M6 is able to protect the occupant MP smoothly by arresting the head H of the occupant MP with the roof airbag 35E quickly and arresting the upper body UB by the front airbag 20E.

Moreover, in the occupant protection device M6 of the sixth embodiment, the roof airbag 35E is configured to be brought into contact with the window airbag 66 as deployed on the outboard-side edge (or right edge) 35e when fully deployed. With this configuration, with the right edge 35e portion supported by the window airbag 66, the roof airbag 35E will be prevented from slipping towards an outboard direction, thus able to protect the head H of the occupant MP which moves diagonally forward towards the outboard direction (i.e. diagonally forward to the right), in the event of an oblique collision or an offset collision.

Although the foregoing embodiments have been described as aiming to protect an occupant MP sitting in the passenger seat PS, the application of the invention should not be limited thereby. The invention may also be applied to an occupant protection device which aims to protect an occupant sitting in the driver's seat.

What is claimed is:

1. An occupant protection device adapted to be mounted on a vehicle for protecting an occupant sitting in a front seat of the vehicle, the occupant protection device comprising:
    a front airbag device that is adapted to be mounted in front of the front seat and actuated when an impact is applied to the vehicle from forward, the front airbag device including a front airbag that is inflatable and deployable in front of the front seat for protecting an upper body of the occupant; and
    a roof airbag device that is adapted to be mounted on a roof of the vehicle and actuated when an impact is applied to the vehicle from forward, the roof airbag device including a roof airbag that is inflatable and deployable downwardly between the front airbag and the front seat for protecting a head of the occupant, the roof airbag being deployable and configured such that a front surface of the roof airbag generally fits, in contour, a rear surface of the front airbag as deployed,
    wherein the roof airbag as fully inflated has such a contour that a width thereof in a front and rear direction is great in an upper end portion thereof and reduces toward a lower end thereof.

2. The occupant protection device of claim 1, wherein the roof airbag device is configured to be actuated generally simultaneously with a detection of the impact and complete deployment of the roof airbag before the front airbag completes deployment.

3. The occupant protection device of claim 1, wherein the roof airbag includes, in a rear upper end portion thereof as deployed, a mounting region to the roof.

4. The occupant protection device of claim 1, wherein a width in an up and down direction of the roof airbag as deployed is such that a lower end of the roof airbag as deployed is disposed in a vicinity of a lower end of a head rest of the front seat.

* * * * *